No. 892,155. PATENTED JUNE 30, 1908.
F. W. HODGES.
CARBURETER.
APPLICATION FILED MAR. 5, 1906.
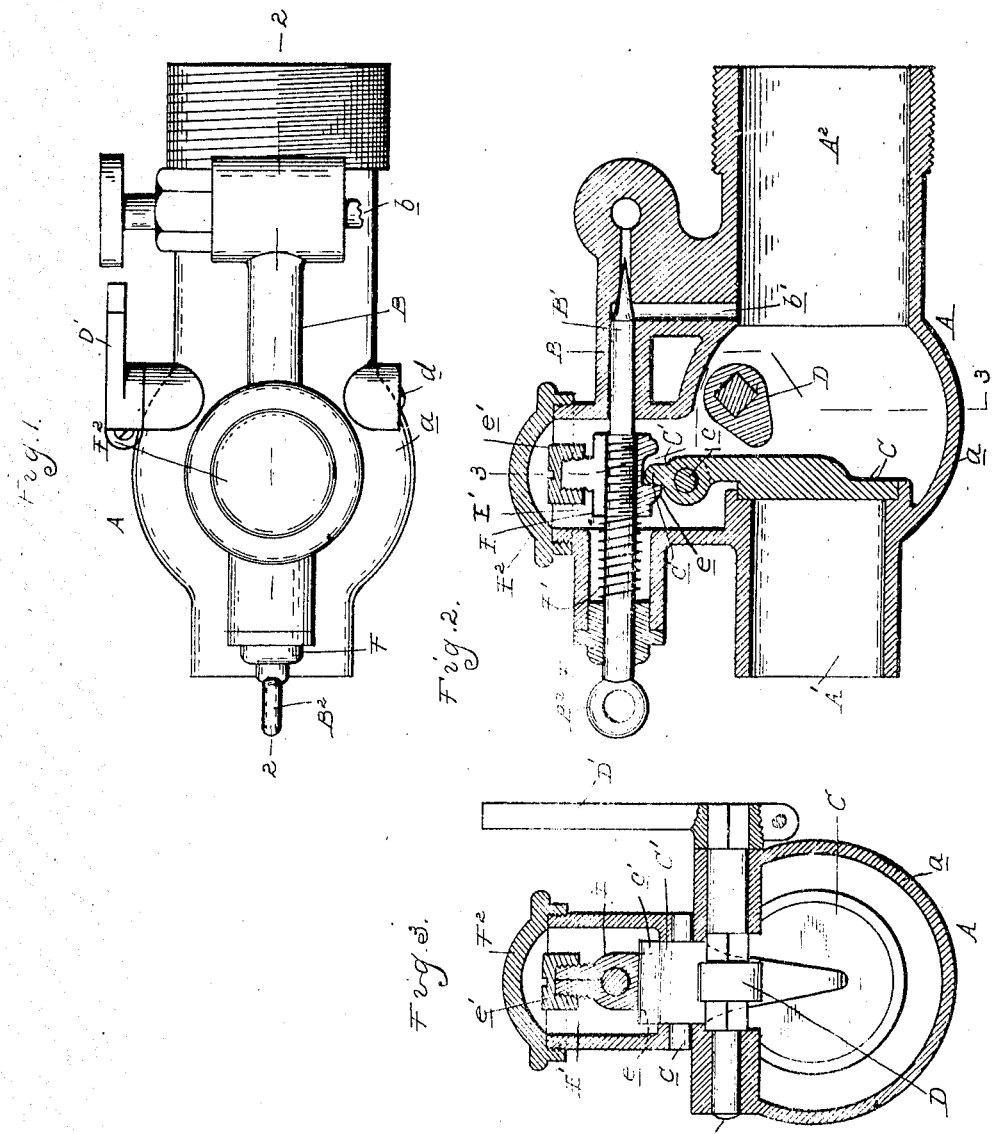

UNITED STATES PATENT OFFICE.

FREDERICK W. HODGES, OF DETROIT, MICHIGAN.

CARBURETER.

No. 892,155.　　　Specification of Letters Patent.　　　Patented June 30, 1908.

Application filed March 5, 1906. Serial No. 304,466.

*To all whom it may concern:*

Be it known that I, FREDERICK W. HODGES, a citizen of the United States of America, residing at Detroit, in the county of Wayne and State of Michigan, have invented certain new and useful Improvements in Carbureters, of which the following is a specification, reference being had therein to the accompanying drawings.

My invention relates to new and useful improvements in vaporizers for hydro-carbon oils for internal combustion motors and consists in a novel construction and combination of parts, as will be more fully hereinafter described and set forth in the claims.

In the drawings, Figure 1 is a plan view of my device; Fig. 2 is a vertical central section on lines 2—2, Fig. 1; Fig. 3 is a vertical section on lines 3—3, Fig. 2.

A is a hollow casing having inlet and outlet openings A' A² respectively and a central portion $a$, preferably globular in form.

The needle valve casing B for the needle valve B' is preferably parallel and integral with the casing A and is connected by a fuel pipe $b$ with the oil supply. The fuel conduit $b'$ leads from the fuel pipe through the casing B and opens into the casing A just above the globular portion $a$. The conduit $b'$ is arranged to be closed by the needle valve B'.

C is a flap or hinge valve pivoted in the globular portion of the casing on a pin $c$ and is arranged to seat over the inlet A'. The opening of this valve is limited by a cam D mounted on a rock shaft $d$ journaled in the casing and operated by a suitable hand lever D'. A lug or arm C' carrying a suitably rounded knob $c'$ projects from the valve C beyond its pivot and the valve thus acts as a lever fulcrumed on the pin $c$. The knob $c'$ engages a lug $e$ on the split collar E which is threaded on the stem of the needle valve and is located in a recess E' in the valve casing B. The ends of this split collar are threaded for engagement with a jam nut $e'$ and an opening covered by a removable cap E² gives access to the recess E' for the purpose of adjusting the collar E.

The lower end of the casing B is internally threaded for engagement with the annular plug F, through which the stem of the valve B' projects with sliding fit and terminates in a suitable ring B² by which the valve may be rotated to adjust the split collar. Between and bearing against the split collar and the plug F on the stem of the valve B' is sleeved a spiral spring F' for yieldingly pressing the valve to its seat.

Having thus described the construction and arrangement of the parts, the operation is as follows:—A partial vacuum being formed in the casing A on the outlet side of the valve C by the intake stroke of the motor, the valve C will be opened, the knob $c'$ will engage the lug $e$ and open the valve B', thereby permitting fuel to flow through the conduit $b'$ into the casing, where it will be vaporized by the incoming air. By rocking the cam D, the lift of the valve C may be limited and consequently the depression of valve B'. The valve C thus acts as a throttle and the openings of the two valves being in proportion, the mixture will be substantially constant for all degrees of opening. When it is desired to change this proportion, the split collar may be adjusted on the stem of valve B' and it is obvious that such a change will vary the opening of this valve in relation to the opening of the valve C.

I do not wish to limit myself to the particular form and construction of the device above described, as other forms may be employed without departing from the scope of my invention.

What I claim as my invention is:—

1. In a vaporizer for hydro-carbons, a pivoted air valve and a needle valve regulating the fuel-feed to said vaporizer, said valves bearing curved surfaces, in constant contact, for the purpose described.

2. In a vaporizer for hydro-carbons, the combination with a pivoted air valve, of a needle valve regulating the fuel-feed and curved projections on said air valve and the stem of said needle valve, said projections being in constant contact, for the purpose described.

3. In a vaporizer for hydro-carbons, the combination with a hollow casing having inlet and outlet openings, a hinged valve for said inlet opening adapted to be operated by the entering air, a fuel-feed conduit opening into said casing, a fuel valve therefor, connections whereby said fuel valve is opened by said inlet valve, separate means for limiting the opening of said air valve, and means for varying the opening of said fuel valve.

4. In a vaporizer for hydro-carbons, the combination with a hollow casing having inlet and outlet openings, a hinged air valve for said inlet opening adapted to be operated by the entering air, a fuel-feed conduit opening into said casing, a fuel valve therefor, constant connections whereby said fuel valve is opened by the opening of said air valve, a resilient member for closing said fuel valve, and pivoted cam for limiting the opening of said air valve, for the purpose described.

5. In a vaporizer for hydro-carbons, the combination with a casing having inlet and outlet openings, of an air valve for said inlet opening pivoted in said casing, a fuel-feed conduit opening into said casing, a valve in said conduit, an adjustable constant connection between said valves whereby the operation of said air valve will operate said needle valve, and a resilient member for returning said needle valve to its seat.

6. In a vaporizer, the combination with a casing forming a mixing chamber and an air valve therein, of a fuel-feed conduit opening into said casing on the outlet side of said air valve, a needle valve controlling said conduit and having its stem extending adjacent to said air valve, a split collar adjustably sleeved on said stem, and a projection on said collar adapted to be directly engaged by said air valve, for the purpose described.

7. In a vaporizer for hydro-carbons, a pivoted air valve, a fuel feed regulating needle valve having its stem adjacent thereto, and a projection on said air valve in constant contact with said stem for the purpose described.

8. In a vaporizer for hydro-carbons, a variably opening air valve, having a projection on one side thereof, and a fuel feed regulating needle valve having a projection on its stem adjacent to the projection on said air valve, and co-acting in contact therewith for the purpose described.

In testimony whereof I affix my signature in presence of two witnesses.

FREDERICK W. HODGES.

Witnesses:
 AMELIA WILLIAMS,
 EDWARD D. CULT.